Feb. 7, 1967   R. G. STRAUSS   3,303,249
MANUFACTURING PLASTIC ARTICLES
Filed Dec. 3, 1963
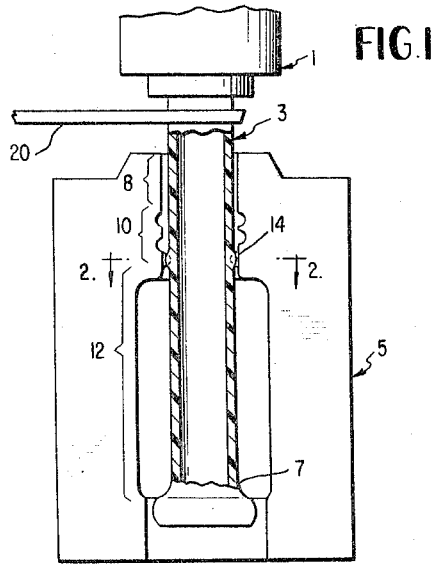
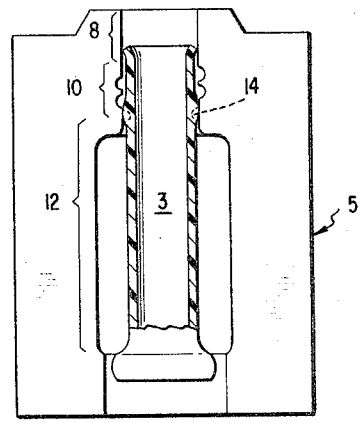
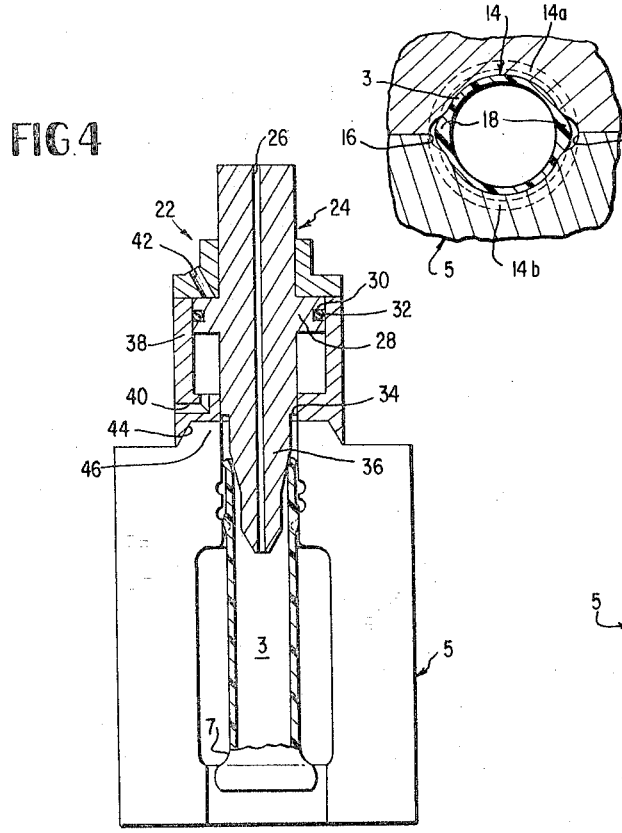
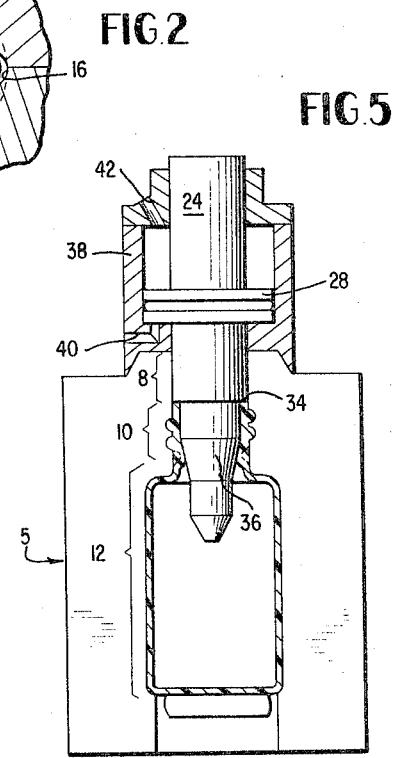
INVENTOR.
ROBERT G. STRAUSS
BY Burns, Doane, Benedict, Swecker & Mathis
ATTORNEYS United States Patent Office 3,303,249
Patented Feb. 7, 1967

3,303,249
MANUFACTURING PLASTIC ARTICLES
Robert G. Strauss, West Hartford, Conn., assignor to Monsanto Company, a corporation of Delaware
Filed Dec. 3, 1963, Ser. No. 327,789
13 Claims. (Cl. 264—98)

This invention relates to improvements in a process for manufacturing blown thermoplastic articles.

In the past, the plastic article industry has provided apparatus for forming plastic bottles and the like by longitudinally compressing a parison and thereby press molding the bottle neck portion prior to the blow molding of the body portion. Such apparatus usually includes a mandrel having a stem and an enlarged shoulder portion adapted to be axially advanced into a recessed top portion of a parison holding, multiple section mold. However, in a high speed operation this method and apparatus for forming blown plastic bottles is not without drawbacks. For example, in practicing this technique, it is desirable to close a multiple section mold snugly on the parison in order to inhibit axial movement of the parison during the longitudinal compression and press molding of the neck portion thereof. Such a tight closure sometimes causes parison pinching and this tends to form an undesirable amount of flash or fins on the bottle being formed at the junction of the mold sections. Further, if axial slippage of the parison occurs, it is difficult to achieve uniform bottle wall thickness. Additionally, of rotary motion is imparted to a mandrel, such motion sometimes tends to cause rotation of the parison with similar undesirable results.

It is an object of this invention to provide a process for axially compressing and press molding a portion of a parison while inhibiting axial movement of the entire parison.

It is an additional object of this invention to provide a process for axially compressing and press molding a portion of a parison while inhibiting rotational movement of the parison.

It is another object of this invention to provide a method wherein, after a parison is severed from its source, it will recede into a mold cavity to enhance gripping action prior to press molding.

It is a further object of this invention to provide a process for press molding plastic bottles and the like with a finished upper face and a smoother internal diameter but wherein flash is reduced and uniformity in wall thickness is increased.

In achieving these and other objects which will appear hereinafter, this invention provides for extruding a parison from an extrusion nozzle, positioning the parison in a mold having neck and body forming cavities, gripping the parison in the mold at a closed end of the body forming portion, peripherally gripping the parison in a limited area of the neck forming cavity to indent the parison in a single annular zone with the remainder of the parison in said neck forming cavity being ungripped, press molding the portion of the parison in the neck forming cavity by the introduction of axially advancing mandrel means into the neck forming cavity, and blow molding the portion of the parison in the body forming cavity.

To improve the grip of closed mold sections on a parison, laterally extending protrusions may be formed on the parison in the neck forming cavity of the mold.

To even more positively inhibit parison slippage, the parison may be stretched prior to severance from an extrusion nozzle. Subsequent to the gripping of the parison in a mold and after the severance of the parison, the parison is allowed to simultaneously recede into the cavity of the mold and laterally expand.

Finally, to aid in aligning an axially advancing mandrel with a mold cavity, centering means may be provided between the cooperating faces of a mandrel cylinder and the mold. Such centering means comprise a tapered projection on one of said faces and a tapered recess in the other of said faces, with the recess being adapted to receive the projection and thereby closely align the mandrel with the mold cavity.

A preferred embodiment of the present invention is illustrated in the accompanying drawings, in which:

FIGURE 1 is a schematic, vertical, sectional view representing the preferred apparatus embodiment at an early stage in the present inventive process;

FIGURE 2 is a schematic, horizontal, cross-sectional view of a multiple section mold cavity of this invention taken along line 2—2 in FIGURE 1;

FIGURE 3 is a schematic, vertical sectional view of this invention in a subsequent phase after severance of a parison from an extrusion nozzle and recession of the same into a mold cavity;

FIGURE 4 is a schematic, vertical, sectional view of the present invention after alignment and introduction of a mandrel into a mold cavity; and FIGURE 5 is a schematic, vertical, sectional view of this invention at the completion of the press and blow molding cycle.

Referring in more detail to FIGURE 1 of the drawings, there is provided an extrusion head or nozzle 1 from which plasticized material, for example, polyethylene, is extruded in tubular form. The tubular material or parison 3 is positioned between sections of a multiple section mold 5 and the mold is closed thereon to close the lower end of the parison 7 in the usual manner.

The parison receiving cavity of the mold 5 includes an upper portion 8, an intermediate or neck forming portion 10, and a lower or base forming portion 12 of a relatively increased diameter. The mold 5 is further provided with a parison gripping rim or dam 14, as shown in FIGURE 2, projecting from the cavity walls into and defining the lowest extremity of the intermediate portion 10 of the cavity. Rim 14 has notches 16 for embracing laterally extending protrusions 18 of the parison 3. The manner in which protrusions 18 are formed is hereinafter described. As will be appreciated, rim 14 is composite in nature and comprises a semi-cylindrical rim portion 14a carried by one mold half and a mating semi-cylindrical rim 14b carried by the other mold half as shown in FIGURE 2. As is further shown in FIGURE 2, the notches 16 are located at the junctions of the closed mold halves and are defined by recessed portions at each end of each rim portion 14a and 14b.

It will be seen that the rim projects radially into cavity portion 10 in what may be considered to be a single annular zone of the intermediate portion 10 of the cavity and the internal diameter of the rim 14 is less than the internal diameter of the remainder of the intermediate portion 10. The rim 14 projects into the intermediate portion 10 of the cavity a sufficient distance to indent and restrain the parison during subsequent phases of this process. It is now considered that the projection distance should be at least 25 percent of the parison wall thickness if the parison is to be properly restrained. A projection distance of about 50 percent of the parison wall thickness has been found in practice to provide a proper parison gripping action.

After the parison 3 is gripped in the mold cavity at the lower end 7 of the parison and at a limited part of the neck forming portion by the rim 14, axial relative movement may be caused between the extrusion nozzle 1 and the mold 5 to thereby stretch the parison 3 prior to severance of the same from its source by a knife 20 or the like. Severance of the parison 3 in its stretched condition causes the portion of the parison extending above the mold 5 and the portions in the upper and intermediate portions 8, 10 of the mold cavity to axially shrink after severance, to the position shown in FIGURE 3.

The gripping of the parison by the rim 14 may tend to influence a different degree of parison stretching and contraction of the portion of the parison above the rim 14 as to the portion of the parison below this rim. When an axial pull is exerted on the parison so as to tend to stretch it between the extrusion outlet and the lower parison end 7, it is likely that the portion of the parison above the rim 14 will be stretched to a somewhat greater extent than the portion below this rim because of the gripping effect of the rim 14. Similarly, when the parison is severed from the extrusion outlet, it will be expected that the portion of the parison above the rim 14 will undergo somewhat greater axial shrinkage and lateral expansion than the portion of the parison below this rim. It is believed that the possible differential stretching and retraction effect may tend to provide a somewhat greater amount of parison material above the rim 14 than would otherwise be formed and produce a more positive engagement between the parison and the rim 14.

It will be seen that this axial shrinkage causes that portion of the parison immediately above the rim 14 to laterally expand and bell-out over the rim 14 and further into the notches 16 to aid in inhibiting longitudinal and rotary slippage of the parison and also to increase the thickness of the parison in the upper and intermediate cavity portions. However, it should be noted that the parison gripping rim may be employed without the parison stretching feature of this invention.

After the upper portion of the parison has receded into the upper and intermediate portions of the mold cavity, the extrusion nozzle 1 is removed from alignment with the mold and is replaced by a blow head assembly 22, as indicated in FIGURE 4, in the usual manner. The blow head assembly may comprise a circular mandrel 24 having a longitudinally extending air passage 26 and a radially extending piston 28 having a circumferential groove 30 to receive a piston ring 32. The mandrel 24 is further provided with a collar or shoulder portion 34 and a tapered stem 36. The function of the mandrel shoulder portion 34 is to finish form the upper face of the parison during axial compression and press molding of the parison. Similarly, the function of the mandrel stem 36 is to finish form the internal diameter of the neck portion of the article being shaped.

The mandrel 24 is slidably received in a mandrel cylinder 38 having fluid ports 40 and 42 provided for directing pressurized fluid to the lower or upper faces of the mandrel piston 28 to thereby move the mandrel in an axial direction. The lower face of the mandrel cylinder 38 is further provided with a tapered recess 44 adapted to receive an upwardly projecting tapered centering collar 46 on the multiple section mold 5.

The process of operation of this invention is as follows:

A parison 3 is extruded which has an outer diameter somewhat less than the inner diameter of the upper portion 8 and the major part of the intermediate portion 10 of the mold 5. After such a parison 3 has been extruded, the mold halves may be closed about the parison with there being no flash formation due to the undersized character of the parison. At the time the mold halves are closed, the rim 14 may engage the parison so as to effect at least a partial peripheral indentation thereof.

With the mold halves closed about the parison 3, the parison is gripped at the lower end 7 by the closed mold and is secured at the upper end by the extrusion nozzle 1. As will be apparent, when the rim portions 14a and 14b indent the outer periphery of the parison 3, the parison will be somewhat compressed so as to cause parison portions or protrusions 18 to extend into the rim notches 16. Subsequently, relative axial separation of the mold 5 and the extrusion head 1 may be effected to thereby place the parison 3 in a stretched condition. After severance of the parison 3 from the extrusion nozzle 1 by the knife 20, the upper portion of the parison is permitted to recede into the upper and intermediate portions of the cavity.

As the parison shrinks, it laterally expands over the rim 14 and further into the notches 16 to make more firm the gripping action by the notched rim 14 and consequently aids in restraining the parison during the critical stage of this process wherein axial advance of the mandrel 24 tends to dislocate the parison.

In the event that the initial closing of the mold halves about the parison 3 would not bring the mold rim 14 into periphery indenting contact with parison 3, the axial shrinkage and consequential lateral expansion of the parison will insure the obtaining of such engagement between the rim 14 and the parison. A sufficient grip on the parison is thus achieved without an extremely tight closure of the mold on the entire neck forming portion of the parison which might pinch the parison at the junction of the mold sections and form an excessive amount of flash on the finished article. Further, the shrinkage provides a preliminary stuffing of the parison in the intermediate cavity prior to the advance of the mandrel 24.

Upon severance of the parison 3 from the extrusion nozzle parent supply, the extrusion nozzle 1 is removed from alignment with the mold 5 and is replaced by the blow head assembly 22. Although usual means are employed to generally align the blow head assembly 22 with the mold 5, accurate alignment of these elements prior to the introduction of the mandrel shoulder portion 34 into the upper portion 8 of the mold cavity is insured by the provision of a circular, tapered recess 44 in the lower face of the mandrel cylinder 38 which cooperates with the circular, upwardly projecting centering collar 46 on the upper face of the mold 5. Because these elements have a tapered contact surface, axial engagement of the recess 44 with the centering collar 46 eliminates any slight lateral misalignment therebetween. It will be appreciated that although the present invention employs movement of the extrusion nozzle 1 and the blow-head assembly 22 for alignment of these elements with the mold 5, the present invention includes the converse movement within its scope, i.e. movement of the mold to align it with the extrusion nozzle and the blowhead assembly.

After alignment, the mandrel 24 is axially advanced to the position shown in FIGURE 4 by directing fluid through the port 42 against the upper face of the mandrel piston 28. The stem 36 and shoulder portion 34 of the mandrel 24 are moved through the upper portion 8 of the mold cavity to axially compress and move the upper parison end through the upper portion 8 and press mold the same in the intermediate portion 10 of the cavity, the plastic material being dammed therein by the rim 14.

It should be noted that the provision of the notches 16 in the rim 14 is of additional significance in that, during the axial compression and press molding of the upper portions of the parison by the mandrel shoulders 34, these notches provide a small channel through which excess material may be directed between the neck and base portion of a bottle or the like being formed. Although the rim 14 generally acts as a material dam at the lowest extremity of the neck forming or intermediate portion 10 of the cavity, the tendency to form flash or a fin during the press molding stage is reduced by the provision of this small release channel through the dam for excess material.

An additional advantage attributable to the notched character of the rim 14 resides in the fact that these notches enable the utilization of a somewhat larger parison than could otherwise be employed. Were the notches not present in the rim 14, and if the parison 3 were somewhat larger in diameter than the rim 14, it is possible that the edges of the rim sections might pinch the parison when the mold halves were closed. However, by having the rim notches, the possibility of such pinching is avoided.

Blow molding of the parison is performed by directing pressurized gas through the mandrel passage 26 during or subsequent to advance of the mandrel by the piston 28.

After completion of the blow molding cycle, the mandrel stem and shoulder portion are retracted by the introduction of fluid through the port 40 to the underside of the mandrel piston 28. The mold may open simultaneously with or subsequently to such retraction, after which the formed article may be removed or blown from the apparatus in the usual manner.

As will be clear to one skilled in the art, conventional automatic means may be provided to perform the various steps of this inventive process in a proper sequence.

The apparatus and molding technique heretofore described may be employed in conjunction with the overall molding apparatus described in United States Letters Patent 2,952,034.

In describing the structure and mode of operation of a schematically represented form of the invention, the advantages of the invention have been demonstrated.

It will be appreciated that longitudinal slippage of the entire parison during axial compression and press molding by the axially advancing mandrel is inhibited by the mold rim without the formation of excessive flash. The provision of notches in the rim to receive laterally extending protrusions on the parison prevents rotational slippage of the parison and enables the use of a somewhat larger size parison than could otherwise be employed. Gripping action is enhanced by parison stretching and subsequent shrinkage. Finally, novel alignment means between the blowhead assembly and the mold function to accurately align these elements at the most critical phase, i.e., during the insertion of the increased diameter mandrel shoulder portion in the upper cavity portion.

The stretching of the parison and subsequent recession of the severed parison end entirely into the neck-forming cavity is especially significant. This avoids the formation of excess parison material on the exterior or upper face of the mold which might result if the mandrel shoulder 34 cut through the parison end in entering the mold cavity. Additionally, this complete recession of the parison end insures the free and unimpeded entry of the mandrel shoulder 34 into the mold cavity.

While in describing the preferred embodiment of the overall invention, its several features have been described in cooperative relationship, it will be apparent that these features entail independent as well as cooperative significance.

Various other modifications and alterations will suggest themselves readily to persons skilled in the art. It is intended, therefore, that the foregoing be considered as exemplary only, and that the scope of the invention be ascertained from the following claims.

I claim:
1. The method of forming a hollow article having neck and body portions comprising extruding a parison from an extrusion nozzle, positioning the parison in a mold having neck and body forming cavities, gripping the parison in the mold at a closed end of the body forming cavity, peripherally gripping the parison in a limited area of the neck forming cavity to indent the parison in a single annular zone with the remainder of the parison in said neck forming cavity being ungripped, press molding the portion of the parison in the neck forming cavity by the introduction of axially advancing mandrel means into the neck forming cavity, and blow molding the portion of the parison in the body forming cavity.

2. The method of forming a hollow article according to claim 1 wherein said parison is gripped in said neck forming cavity by being peripherially indented to a depth equal to at least 25 percent of the parison wall thickness.

3. The method of forming a hollow article according to claim 1 wherein said parison is gripped in said neck forming cavity by being peripherally indented to a depth equal to approximately 50 percent of the parison wall thickness.

4. The method of forming a hollow artcile according to claim 1 wherein the mandrel means, in axially advancing into the neck forming cavity, axially compresses the parison therein to thereby press mold the same.

5. The method of forming a hollow article having neck and body portions comprising extruding a parison from an extrusion nozzle, positioning the parison in a mold haivng neck body forming cavities, gripping the parison in the mold at a closed end of the body forming cavity, peripherally gripping the parison in a limited area of the neck forming cavity to indent the parison in a single annular zone with the remainder of the parison in said neck forming cavity being ungripped, axially compressing and press molding the portion of the parison in the neck forming cavity to form threads about th external periphery of the parison, and blow molding the portions of the parison in the body forming cavity.

6. The method of forming a hollow article having neck and body portions comprising extruding a parison from an extrusion nozzle, positioning the parison in a mold having adjacent neck and body forming cavities, gripping the parison in the mold at a closed end of the body forming cavity and at a limited are of the neck forming cavity in a single annular zone at the junction of the neck and body forming cavities so as to indent the parison, the remainder of the parison in the neck forming cavity being ungripped, axially compressing and press molding the portion of the parison in the neck forming cavity, and blow molding the portion of the parison in the body forming cavity.

7. The method of forming a hollow article having neck and body portions comprising extruding a parison from an extrusion nozzle, positioning the parison in a mold having neck and body forming cavities, gripping the parison in a mold at a closed end of the body forming cavity, gripping a limited portion of the parison in a single annular zone of the neck forming cavity to form laterally extending protrusions within said neck forming cavity, the remainder of the parison in the neck forming cavity being ungripped, axially compressing and press molding the portion of the parison in the neck forming cavity, and blow molding the portion of the parison in the body forming cavity.

8. The method of forming a hollow article having neck and body portions comprising extruding a parison from an extrusion nozzle, positioning the parison in a multiple section mold having neck and body forming cavities, gripping the parison in the mold at a closed end of the body forming cavity, peripherally gripping a limited portion of the parison to indent the same in a single annular zone of the neck forming cavity while forming laterally extending protrusions on said parison in said zone at the junction of the mold sections, the remainder of the parison in the neck forming cavity being ungripped, axially compressing and press molding the portion of the parison in the neck forming cavity, and blow molding the portion of the parison in the body forming cavity.

9. The method of forming a hollow article from plastic material comprising extruding a parison from an extruding nozzle, gripping the parison in a mold cavity having neck and body forming portions peripherally gripping the parison in a limited area of the neck forming portion to indent the parison in a single annular zone, axially stretching the parison, severing the parison in a stretched condition from the extrusion nozzle, permitting the parison to recede into said cavity, and press molding and blow molding the parison to form the article.

10. The method of forming a hollow article having neck and body portions comprising extruding a parison from an extrusion nozzle, gripping the parison in a mold at a closed end of the body forming cavity, peripherally gripping the parison in a limited area of the neck forming cavity to indent the parison in a single annular zone, the remainder of the parison in said neck forming cavity being ungripped, axially stretching the parison, severing the parison in a stretched condition from the extrusion nozzle, permitting the parison to recede into said neck forming cavity, axially compressing and press molding the portion of the parison in the neck forming cavity, and blow molding the parison in the body forming cavity.

11. The method of forming a hollow article having neck and body portions comprising extruding the parison from an extrusion nozzle, positioning the parison in a mold having adjacent neck and body form cavities, gripping the parison in the mold at a closed end of the body forming cavity and at a limited area of the neck forming cavity in a single annular zone at the junction of the neck and body forming cavities so as to indent the parison, the remainder of the parison in the neck forming cavity being ungripped, axially stretching the parison, severing the parison in a stretched condition from the extrusion nozzle, permitting the parison to recede entirely into said neck forming cavity, axially compressing and press molding the portion of the parison in the neck forming cavity, and blow molding the portion of the parison in the body forming cavity.

12. The method of forming a hollow article having neck and body portions comprising extruding a parison from an extrusion nozzle, positioning the parison in a mold having neck and body forming cavities, gripping the parison in the mold at a closed end of the body forming cavity, gripping a limited portion of said parison in a single annular zone of said neck forming cavity to form laterally extending protrusions within said neck forming cavity, the remainder of the parison in the neck forming cavity being ungripped, axially stretching the parison, severing the parison in a stretched condition from the extrusion nozzle, permitting the parison to recede into said neck forming cavity, axially compressing and press molding the portion of the parison in the neck forming cavity, and blow molding the portion of the parison in the body forming cavity.

13. The method of forming a hollow article having neck and body portions comprising extruding a parison from an extrusion nozzle, positioning the parison in a mold having neck and body forming cavities, gripping the parison in a mold at a closed end of the body forming cavity, peripherally gripping the parison in a limited area of the neck forming cavity to indent the parison in a single annular zone while forming laterally extending protrusions on the parison in said zone, the remainder of the parison in the neck forming cavity being ungripped, axially stretching the parison, severing the parison in a stretched condition from the extrusion nozzle, permitting axial recession of said parison, axially compressing and press molding the portion of the parison in the neck forming cavity, and blow molding the portion of the parison in the body forming cavity.

References Cited by the Examiner
UNITED STATES PATENTS

| | | | |
|---|---|---|---|
| 3,032,809 | 5/1962 | Willard | 264—99 |
| 3,125,619 | 3/1964 | Miller | 264—98 |
| 3,217,072 | 11/1965 | Schaich | 264—98 |

ROBERT F. WHITE, *Primary Examiner.*

A. R. NOE, *Assistant Examiner.*